United States Patent Office 3,236,653
Patented Feb. 22, 1966

3,236,653
HARDENING OF POLYVINYL ALCOHOL MALEATES
Marcel Nicolas Vrancken, Berchem-Antwerp, Alfons Jozef De Pauw, Edegem-Antwerp, and René Maurice Hart, Wilrijk-Antwerp, Belgium, assignors to Gevaert Photo-Producten N.V., Mortsel, Belgium, a Belgian company
No Drawing. Filed Nov. 20, 1961, Ser. No. 154,105
3 Claims. (Cl. 96—111)

It is known from the British patent specification 860,-632 that a reaction product of a macromolecular compound containing amino and/or hydroxyl groups, with a compound of the type $$A-\underset{X}{C}=\underset{Y}{C}-Z$$

wherein:

A represents a carboxyl, a carboxymethyl or an aldehyde group,
X and Y each represents a carboxyl group, a hydrogen atom or a halogen atom, and
Z represents a carboxyl group or a hydrogen atom, and wherein at least one of the symbols X, Y and Z represents a carboxyl group, or with an internal anhydride of such compound, can be hardened by the addition of a minor amount of a polyfunctional amine.

Among macromolecular compounds containing hydroxyl groups are understood polyvinyl alcohol and polymers the chain of which wholly or in part consists of —$CH_2$—CHOH— groups, thus also partially saponified polyvinyl esters such as partially saponified polyvinyl formate, polyvinyl acetate or polyvinyl esters of higher fatty acids.

Macromolecular products containing hydroxyl groups comprise also the wholly or partially saponified polyvinyl esters in which the hydroxyl groups have in part reacted to form acetals. Further are comprised the saponified copolymers of vinyl esters, in which the polymeric chain is composed in part of —$CH_2$—CHOH— units and in part of other groups the structure of which depends on the kind of the copolymer used.

The compounds which react with these macromolecular products containing hydroxyl groups and which correspond to the above formula are among other dibasic acids such as maleic acid or maleic acid derivatives.

Such like reaction products, viz. of polyvinyl alcohol and maleic acid or a derivative of maleic acid, are among others described in the Britist patent specification 822,061 and the British patent application 18,194/59.

Among the polyfunctional amines which are used according to British patent specification 860,632 for hardening these reaction products of polyvinyl alcohol and maleic acid or a derivative of maleic acid, gelatin is mentioned.

It has now been found that especially good results are obtained when using as a hardening agent for reaction products of polyvinyl alcohol and maleic acid or a derivative of maleic acid a gelatin with a high isoelectric point (more than 8) and which possesses a good gel strength. The gel strength amounts to 220 or higher and is determined in the description and the examples of this invention, with a Bloomgelometer according to the method described in Britist Standard 757: 1959, pp. 13–18.

As described in the British patent specification 822,061, the reaction products of polyvinyl alcohol and maleic acid or a derivative of maleic acid are characterized by a certain amount of carboxyl groups which point to a partly half-ester structure.

According to this interpretation the polymeric chains consist of vinyl maleate units of the following structure $$-CH_2-CH- \\ \phantom{-CH_2-}| \\ \phantom{-CH_2-}O-CO-CH=CH-COOH$$

The very strongly marked hardening properties of gelatin, with high isoelectric point and a good gel strength, for reaction products of polyvinyl alcohol with maleic acid or a derivative of maleic acid can be applied in photography in widely varying ways.

(1) The silver halide emulsions can be prepared in an aqueous solution of a small amount of a reaction product of polyvinyl alcohol and maleic acid or a derivative of maleic acid. Hereupon this emulsion is dispersed in a larger amount of the same reaction product which will be used as layer-forming substance. Before applying this emulsion as a layer in a photographic material, a gelatin with a high isoelectric point (more than 8) and a good gel strength is added as a hardening agent.

(2) The silver halide, however, can also be prepared in a gelatin with an isoelectric point of about 4.9 and then be dispersed in a reaction product of polyvinyl alcohol and maleic acid or a derivative of maleic acid. In this case a gelatin with high isoelectric point (more than 8) and with good gel strength is used as a hardening agent.

(3) The silver halide can also be prepared in a gelatin with high isoelectric point (more than 8) and with a good gel strength, and as a layer-forming substance the reaction product of polyvinyl alcohol and maleic acid or a derivative of maleic acid can be used.

In this case no more gelatin has to be added afterwards, if the ratio of starting gelatin to polymeric layer-former is at least 0.25.

By applying these different methods it has been established that the degree of hardening of the final photographic layer increases with increasing degree of esterification of the reaction product of polyvinyl alcohol and maleic acid or a derivative of maleic acid. Moreover the miscibility of gelatin with the reaction product of polyvinyl alcohol and maleic acid or a derivative of maleic acid is better when the degree of esterification of the reaction product is higher.

An increase of the degree of esterification, however, can also impair some way the properties of the layer e.g. danger of reticulating when treated in aqueous medium.

Hence there exists an optimum degree of esterification which is determined by the miscibility, the degree of hardening and the desired characteristics of the layer.

This optimum degree of esterification, however, is considerably lower for the mixture consisting of the reaction product of polyvinyl alcohol and maleic acid or a derivative of maleic acid, and gelatin with a high isoelectric point and a high gel strength than for the mixture comprising gelatin with a low isoelectric point.

There has been established that, due to their good miscibility, the use of gelatin with a high isoelectric point and a good gel strength together with polyvinyl alcohol, 4 to 7% of the alcohol groups of which have been converted into monomaleate groups, admits, according to the above described processes, to cast very homogeneous strongly hardened layers, which do not reticulate when treated in aqueous baths.

The following examples illustrate the invention without limiting, however, the scope thereof. All amounts are given in parts by weight.

*Example 1*

To 100 cm.³ of a 5% aqueous polyvinyl alcohol solution 6% of the alcohol groups of which have been converted into monomaleate groups, 20 cm.³ of a 5% aqueous gelatin solution, with isoelectric point 9 and gel strength 270, are added.

This mixture is brought at pH 8, coated onto small glass plates and dried.

After some days of storing at normal temperature and at normal relative humidity the thus obtained layers do not dissolve anymore in boiling water. On the contrary a layer coated without addition of gelatin dissolves immediately in cold water.

*Example 2*

To 100 cm.³ of a 5% aqueous polyvinyl alcohol solution at pH 7, 5% of the alcohol groups of which have been converted into monomaleate groups, 10 cm.³ of a 5% aqueous gelatin solution with isoelectric point 8.5 and gel strength 220, are added.

This solution is coated onto small glass plates and dried.

After 36 hours of storing at 50° C., the thus obtained layers do not dissolve anymore in boiling water. A layer without gelatin, however, dissolved immediately in cold water.

*Example 3*

To a solution of 35 parts of ammonium bromide, 1 part of potassium iodide and 10 parts of a gelatin with isoelectric point 8.9 and a gel strength 270 in 230 parts of distilled water, 500 parts of a 10% solution of silver nitrate in distilled water are added in one minute.

The temperature of the starting solutions amounts to 40° C. The reaction mixture is kept for 35 minutes at 48° C. during which period the physical ripening takes place.

Immediately hereupon, the emulsion is poured into 120 parts of a 50% aqueous solution of ammonium sulfate acidified up to pH 3 with 6 N sulfuric acid. A fine powdery precipitate is formed at once. The supernatant clear liquid is decanted and the precipitate is washed 4 to 5 times each with 800 parts of water at a temperature below 10° C. until all the soluble salts are removed from the emulsion. After a last washing and decanting, the precipitate is brought into 300 parts of distilled water and allowed to stand for half an hour at room temperature. Thereupon the emulsion is warmed slowly to 40–45° C. with stirring until all the precipitate has dissolved again. Then 100 parts of a 10% aqueous solution of gelatin with isoelectric point 8.9 and gel strength 270, and 350 parts of a 20% aqueous solution of a polyvinyl alcohol are added 6.5% of the alcohol groups of which have been converted into monomaleate groups. The whole is then diluted with distilled water to 1000 parts and homogenized by stirring at 45° C.

For the chemical ripening sodium thiosulfate is added as a sensitizer.

The finished emulsion is coated onto a support with gelatin subbing layer. In order to get a uniform coating, the subbed support is first drawn through a solution of sodium borate so that the cast emulsion immediately jellifies.

*Example 4*

To a solution of 10 parts of a polyvinyl alcohol 4.2% of the alcohol groups of which are converted into monomaleate groups, the following two solutions are added simultaneously in two minutes and while strongly stirring:

A. 100 parts of silver nitrate dissolved in 82 parts of concentrated ammonia and 86 parts of distilled water,
B. 90 parts of potassium bromide and 1 part of potassium iodide dissolved in 220 parts of distilled water.

The temperature of the solutions is 50° C. The reaction mixture is kept for 35 minutes at the temperature of preparation, whereupon it is poured into 400 parts of a 50% aqueous ammonium sulfate solution. By doing so, the emulsion flocculates and after complete settling of the formed precipitate the supernatant mother-lye is decanted. The precipitate is washed twice with a mixture of 200 parts of water and 200 parts of acetone. Then the precipitate is dispersed in a solution of 160 parts of the above half-ester of polyvinyl alcohol in 1000 parts of water. After 15 minutes of stirring at room temperature, the temperature is slowly raised to 35° C. Thereupon, 35 parts of gelatin with isoelectric point 9 and gel strength 250, dissolved in 350 parts of distilled water are added and this mixture is diluted with distilled water up to 2000 parts.

The thus prepared emulsion is coated onto a gelatin subbing layer of a subbed cellulose triacetate support. The obtained layers have a good hardening and a very good adhesion to the support.

We claim:
1. Process for hardening a high molecular weight modified polvinyl alcohol, 4 to 7% of the alcohol groups of which are converted into monomaleate groups, comprising reacting said modified polyvinyl alcohol with a gelatin having an isoelectric point in excess 8 and a gel strength of at least 220.

2. Process of forming a photographic silver halide emulsion which comprises mixing together a water-soluble silver salt and a water-soluble inorganic halide in a dilute aqueous solution of a gelatin having an isoelectric point in excess of 8 and a gel strength of at least 220, ripening the silver halide dispersion in said aqueous solution, precipitating the silver halide dispersion, freeing the silver halide dispersion from the water-soluble byproduct salts, and adding to the silver halide dispersion an aqueous solution of said gelatin and an aqueous solution of a layer-forming binding agent consisting of a high molecular weight modified polyvinyl alcohol 4 to 7% of the alcohol groups of which are converted into monomaleate groups.

3. Process of forming a photographic silver halide emulsion, which comprises mixing together a water-soluble silver salt, a water-soluble inorganic halide, and a dilute aqueous solution of a high molecular weight modified polyvinyl alcohol, 4 to 7% of the alcohol groups of which are converted into monomaleate groups, ripening the silver halide dispersion in said aqueous solution, precipitating the silver halide dispersion, freeing the silver halide dispersion from the water-soluble byproduct salts, and adding to the silver halide dispersion an aqueous solution of said high molecular weight modified polyvinyl alcohol as a layer-forming binding agent, and an aqueous solution of gelatin having an isoelectric point in excess of 8 and a gel strength of at least 220.

References Cited by the Examiner

UNITED STATES PATENTS

| | | | |
|---|---|---|---|
| 2,618,556 | 11/1952 | Hewitson et al. | 96—111 |
| 3,108,995 | 10/1963 | Tourtellotte et al. | 96—111 |

FOREIGN PATENTS

| | | |
|---|---|---|
| 565,862 | 7/1958 | Belgium. |
| 822,061 | 10/1959 | Great Britain. |
| 860,632 | 2/1961 | Great Britain. |

NORMAN G. TORCHIN, *Primary Examiner.*